(12) United States Patent
McKenzie et al.

(10) Patent No.: US 6,318,176 B1
(45) Date of Patent: Nov. 20, 2001

(54) ROTATIONAL INDUCTIVE ACCELEROMETER

(75) Inventors: Lealon Ray McKenzie, Edmond; Ryan Todd Ratliff, Oklahoma City; Nigel Frank Misso, Bethaney, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/535,026

(22) Filed: Mar. 24, 2000

Related U.S. Application Data

(60) Provisional application No. 60/126,397, filed on Mar. 26, 1999.

(51) Int. Cl.⁷ .................................................. G01P 15/11
(52) U.S. Cl. ........................................................ 73/514.31
(58) Field of Search ........................ 73/514.31; 324/200, 324/207.11, 162; 340/669, 683; 360/69; 318/560

(56) References Cited

U.S. PATENT DOCUMENTS

| | | |
|---|---|---|
| 3,775,684 * | 11/1973 | Hoodwin .............................. 324/162 |
| 3,810,393 | 5/1974 | MacDonald . |
| 4,131,020 | 12/1978 | Hugli et al. . |
| 4,245,510 | 1/1981 | Baker . |
| 4,611,491 | 9/1986 | Brown et al. . |
| 4,779,463 | 10/1988 | Woodruff . |
| 4,780,963 | 11/1988 | McMurtry . |
| 4,870,588 | 9/1989 | Merhav . |
| 5,341,682 | 8/1994 | Hulsing, II . |
| 5,473,945 | 12/1995 | Greiff et al. . |
| 5,507,911 | 4/1996 | Greiff . |
| 5,593,431 | 1/1997 | Sheldon . |
| 5,605,598 | 2/1997 | Greiff . |
| 5,627,314 | 5/1997 | Hulsing, II . |
| 5,635,739 | 6/1997 | Greiff et al. . |
| 5,646,350 | 7/1997 | Robinson et al. . |
| 5,760,305 | 6/1998 | Greiff . |
| 5,817,942 | 10/1998 | Greiff . |
| 5,831,164 | 11/1998 | Reddi et al. . |
| 5,920,011 | 7/1999 | Hulsing, II . |
| 5,969,250 | 10/1999 | Greiff . |
| 5,970,779 | 10/1999 | Shonting et al. . |
| 6,076,403 * | 6/2000 | Giroud et al. .................... 73/514.31 |

* cited by examiner

Primary Examiner—Richard A. Moller
(74) Attorney, Agent, or Firm—Merchant & Gould P.C.

(57) ABSTRACT

An inductive rotational accelerometer for assisting in servo control of a hard disc drive using a torsional mass-spring system in combination with an inductance sensitive circuit to detect and measure the rotational vibrations imposed on a hard disc drive. The inductive rotational accelerometer includes a frame member coupled to the disc drive, the frame member supporting a pin on which is disposed a rotational mass. The rotational mass supports conductive blocks which with the rotational mass and the frame member provide a path for inductance.

20 Claims, 5 Drawing Sheets

ROTATIONAL INDUCTIVE ACCELEROMETER

RELATED APPLICATIONS

This application claims the benefit of provisional application Ser. No. 60/126,397 entitled "Rotational Inductive Accelerometer For Measuring And Canceling Rotational Vibration In Disc Drives" filed Mar. 26, 1999.

FIELD OF THE INVENTION

The present invention relates generally to a disc drive system. More particularly, the present invention relates to an apparatus for detecting and measuring rotational vibrations impacting a disc drive in order to improve track following.

BACKGROUND OF THE INVENTION

In a contemporary disc drive, a transducer records information onto a magnetic disc in concentric tracks. Each piece of data that is recorded on the magnetic disc is assigned a location. When the information is needed, the transducer must return to the exact location and track where the piece of data has been stored.

As track densities have increased, disc drives have become more sensitive to vibrations which deflect the transducer from the track it follows or which cause the magnetic disc to vibrate beneath the transducer. In effect, vibrations within the disc drive cause the disc to move or slip underneath the transducer. Motion of the magnetic disc relative to the transducer can cause the transducer to slip further along the track producing read/write errors. Furthermore, a contemporary disc drive needs to meet exacting standards with respect to the speed with which data can be accessed and recorded. Movement of the magnetic disc relative to the transducer slows down both information retrieval times and data recording times for the system. There exists a need to detect and compensate for these vibrations before they cause slipping of the magnetic disc.

Rotational accelerations as low as 21 radians/second$^2$ can cause track slipping. One source of rotational vibration involves disc drives stacked in close proximity to each other. An actuator arm controls the movement of the transducer relative to the magnetic disc for each disc drive. During a seeking mode, the actuator arm of a disc drive will move the transducer rapidly over the surface of the magnetic disc. The rapid movement of the actuator arms in such close proximity to other disc drives can cause rotational vibrations which affect the track following performance of nearby disc drives. When dozens of disc drives are stacked together, the effect can be significant.

Several solutions to this problem have been suggested. Dedicated servo surface systems attempt to maintain constant information regarding the transducer's position relative to the magnetic disc by dedicating a portion of the magnetic disc space to storing this information. This information is then used by a servo control system to compensate for track skipping during use. This solution suffers from the obvious disadvantage of consuming disk space which would otherwise be available for other data.

Embedded servo surface systems embed periodic reference points on the surface of the magnetic disk to provide the system with position information. This system requires less disc surface space than the dedicated servo surface systems, but they do not provide constant position information. Embedded reference points only provide position information periodically as the transducer passes over a reference point. Therefore, embedded servo surface systems do not provide instantaneous and constant position information.

SUMMARY OF THE INVENTION

The use of accelerometers to detect and measure rotational vibrations offers the advantage of requiring little magnetic disc space while at the same time providing constant information to the servo control system enabling the servo control to compensate for rotational vibrations.

The present invention relates to an inductive accelerometer for detecting and measuring rotational vibrations in a disc drive. In accordance with one embodiment of the present invention there is provided a rotational mass disposed on a pin having two ends. The pin is held at its ends by a top frame member and a bottom frame member. Both frame members are secured to the hard disc drive. The pin and rotational mass act as a torsional mass-spring system. Disposed on the rotational mass are ferro-magnetic blocks. The ferro-magnetic blocks overlap the bottom frame member. Together the rotational mass, the ferro-magnetic blocks, and the bottom frame member make a path for magnetic flux. A wire coil is disposed around the bottom frame member. Rotational accelerations cause the rotational mass to twist the pin and rotate momentarily relative to the bottom frame member. This rotation causes a portion of the ferromagnetic blocks not to overlap the bottom frame member. A change in the magnetic flux will result which induces a change in the inductance of the wire coil. The change in inductance of the wire coil is proportional to the rotational acceleration applied to the hard disc drive. By measuring the change in inductance of the wire coil, the system can supply a servo control system with information necessary to compensate for the rotational acceleration so detected.

DETAILED DESCRIPTION

Figure 1:
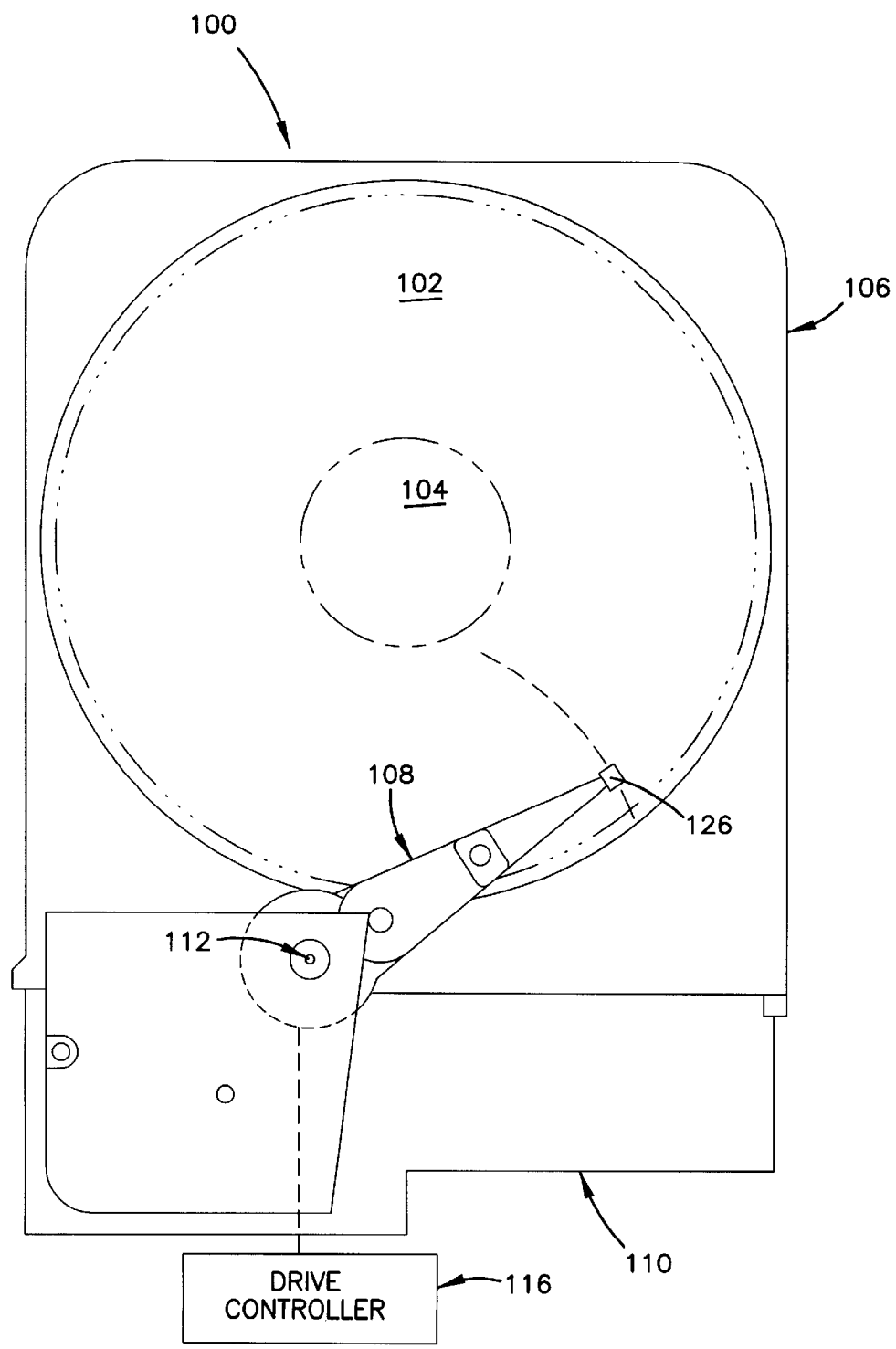
FIG. 1 shows a top view of a disc drive.

FIG. 1 is a top view of a disc drive 100. Disc drive 100 includes a magnetic disc 102 mounted for rotational movement about an axis defined by spindle 104 within housing 106. Disc drive 100 also includes a stacked actuator system 108 mounted to a base plate 110 of the housing 106 and pivotally movable relative to disc 102 about axis 112. The actuator system 108 supports a transducer assembly 126 for reading information on the disc and for encoding information on the disc. The information on the disc 102 is stored in concentric tracks. A cover 114 covers a portion of stacked actuator system 108. Drive controller 116 is coupled to stacked actuator system 108. Drive controller 116 is either mountable within disc drive 100 or is located outside of disc drive 100 with suitable connection to stacked actuator system 108.

Figure 2:
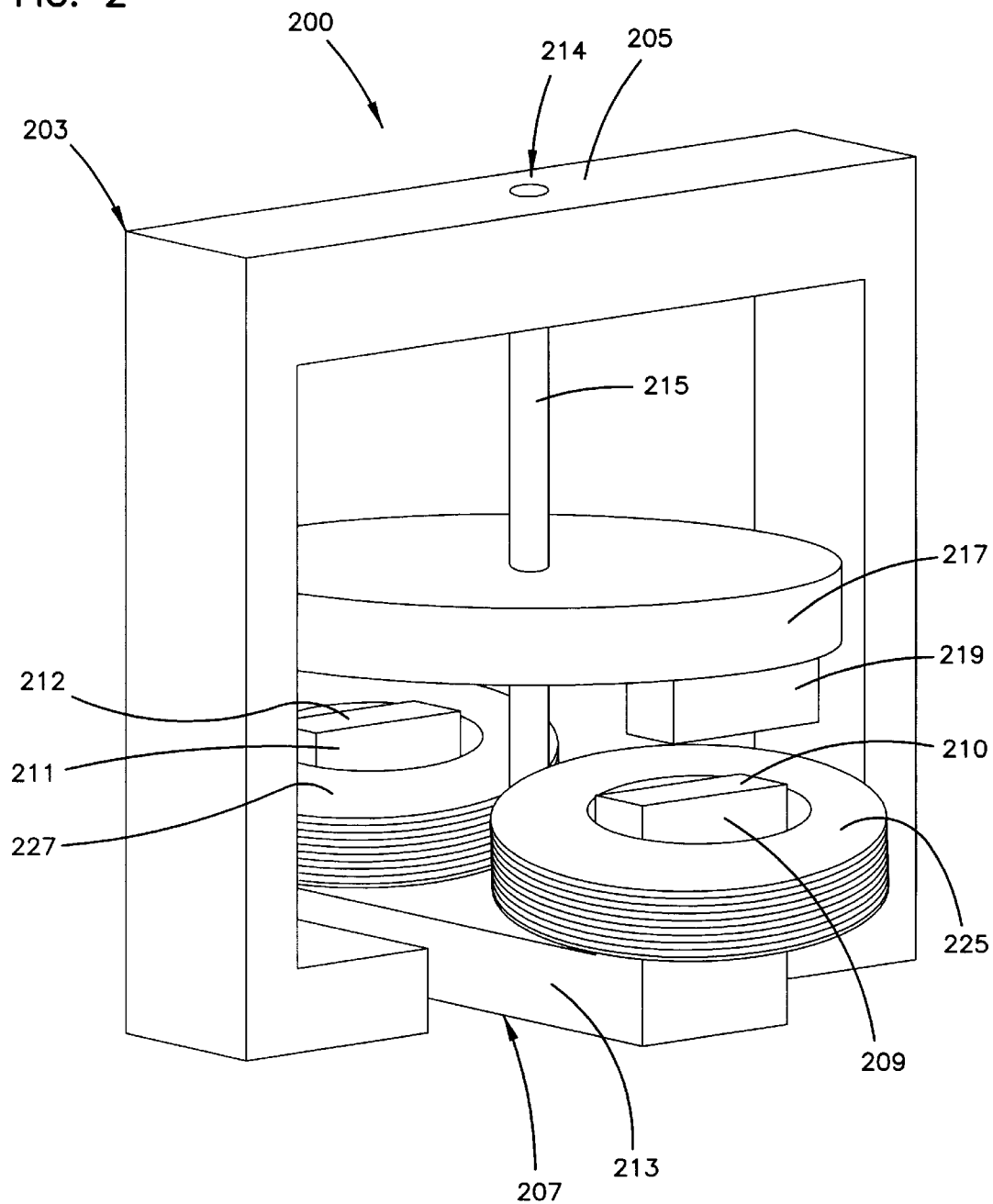
FIG. 2 shows a perspective view of one embodiment of the present invention.

FIG. 2 is a perspective view of a rotational inductive accelerometer 200 configured according to the present invention. The accelerometer 200 comprises a top frame member 203, a ferro-magnetic bottom frame member 207, a pin 215, a ferro-magnetic rotational mass 217, first and second ferro-magnetic blocks 219 and 221, and first and second wire coils 225 and 227.

The top frame member 203 and the bottom frame member 207 are both secured to the housing 106 of the disc drive 100 in FIG. 1. The top frame member 203 includes a top bar 205 which is parallel to the surface of the disc drive housing 106. The bottom frame member 207 includes a bottom bar 213 which is parallel to the surface of the disc drive housing 106. The top frame member 203 is configured to straddle the bottom frame member 207 so that the bottom bar 213 lies between the top bar 205 and the surface of the disc drive housing 106 and so that the top bar 205 and bottom bar 213 are oriented perpendicular to each other. The top frame member 203 may be comprised of steel or an alternative metal, ceramic, plastic or composite. The bottom frame member 207 which includes two side posts 209 and 211, the blocks 219 and 221, and the rotational mass 217 is preferably formed of a ferro-magnetic material.

Figure 5:
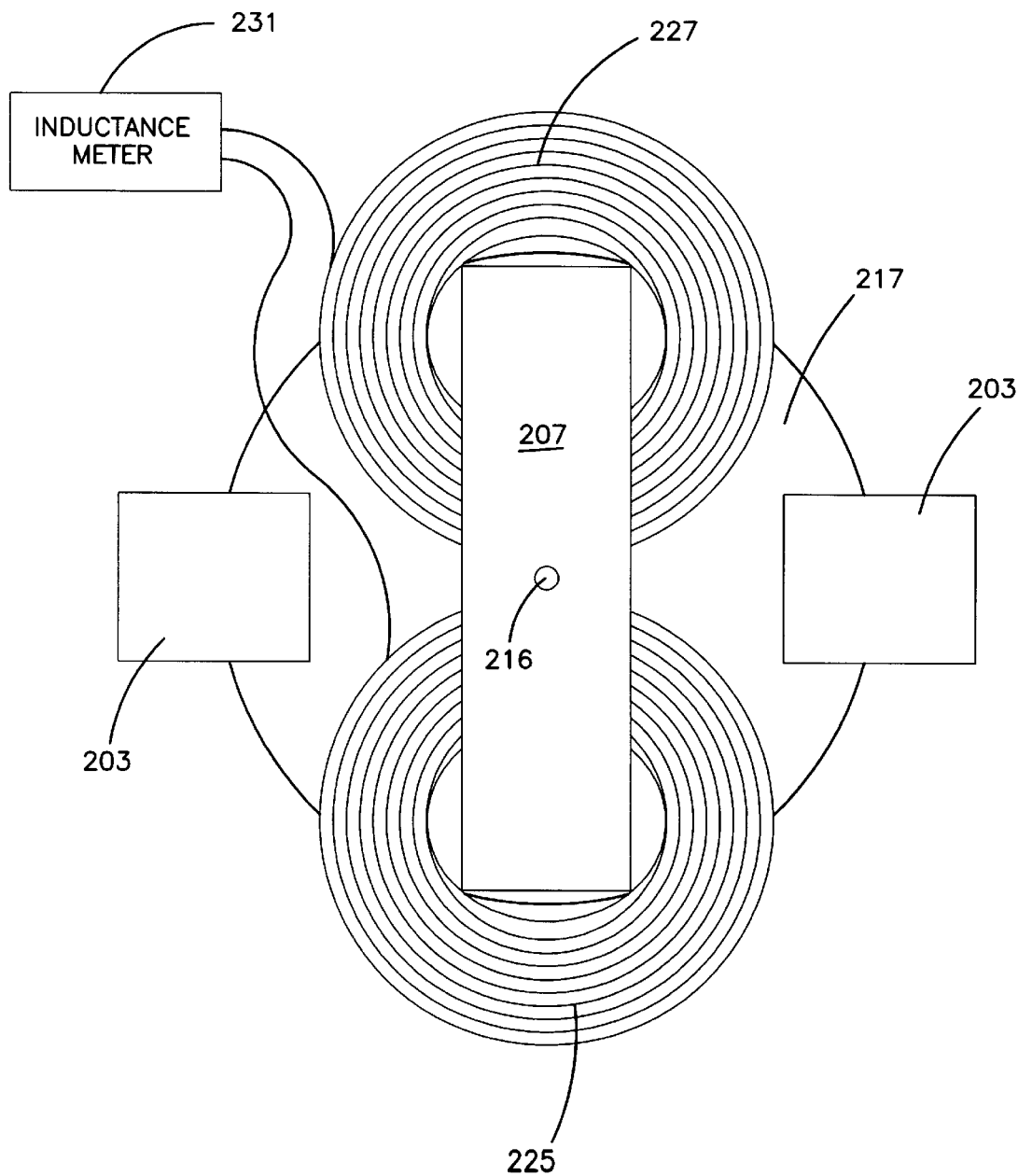
FIG. 5 shows a bottom view of one embodiment of the present invention.

The pin 215 includes a top end 214 and a bottom end 216 (shown in FIG. 5). The pin 215, which preferably is formed of steel, is mechanically pressed through the rotational mass 217. Similarly, the top end 214 is pressed though the top bar 205, and the bottom end 216 is pressed through the bottom bar 213. The pin 215 is disposed between the top bar 215 and the bottom bar 213 so that the pin 215 is substantially perpendicular to the surface of the disc drive housing 106. The pin 215 is capable of twisting along an axis defined by its length.

The rotational mass 217 is characterized by a rotational moment of inertia. That is, the rotational mass 217 may be configured to resist rotational acceleration in a plane parallel to a plane defined by the magnetic disc 102 of the disc drive 100. FIG. 2 shows one preferred embodiment of the system wherein the rotational mass is configured in the shape of a disk.

Together the rotational mass 217 and the pin 215 act as a torsional mass-spring system. The top bar 205 of the top frame member 203 and the bottom bar 213 of the bottom frame member 207 define fixed boundary positions for each end of the pin 215. When not subject to rotational acceleration, the rotational mass 217 maintains a fixed initial position relative to the bottom frame member 207. When rotational acceleration is applied to the disc drive housing 106 and thereby to the top and bottom frame members 203 and 207, which are secured to the disc drive housing 106, each end of the pin 215 experiences rotational acceleration. The rotational mass 217, however, resists the rotational acceleration due to its moment of inertia. This resistance causes the pin 215 to twist momentarily, and the rotational mass 217 is temporarily rotated away from its initial position relative to the bottom frame member. The extent of displacement of the rotational mass 217 away from its initial position is proportional to the magnitude of the rotational acceleration applied to the disc drive housing 106.

The bottom frame member 207 may include two side posts, a first side post 209 and a second side post 211. The side posts 209 and 211 are configured to be perpendicular to the disc drive housing 106. The side posts 209 and 211 may be evenly spaced so that each post is equidistant from the pin 215. The side posts 209 and 211 have uppermost ends 210 and 212.

Figure 3:
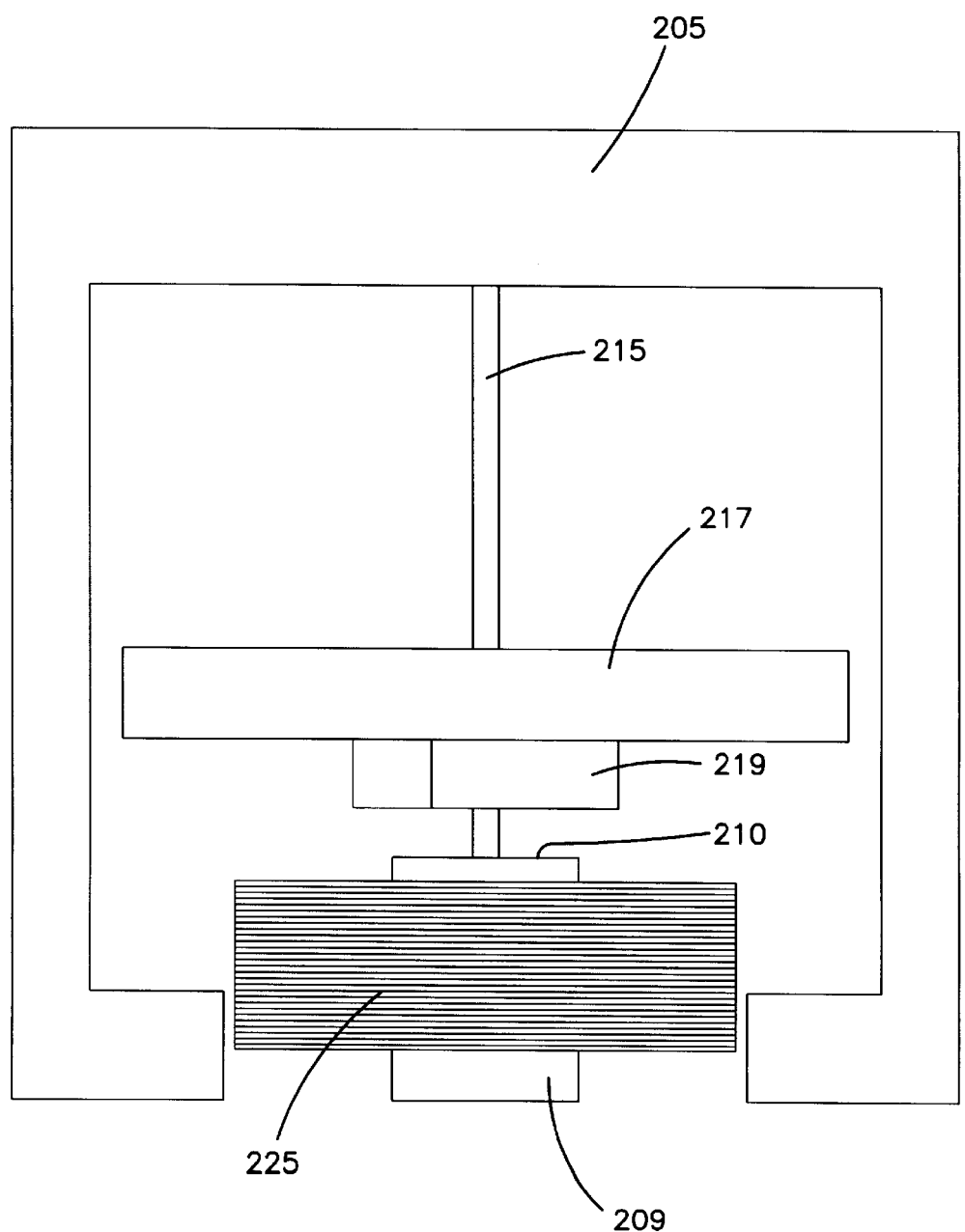
FIG. 3 shows a front plan view of one embodiment of the present invention.
Figure 4:
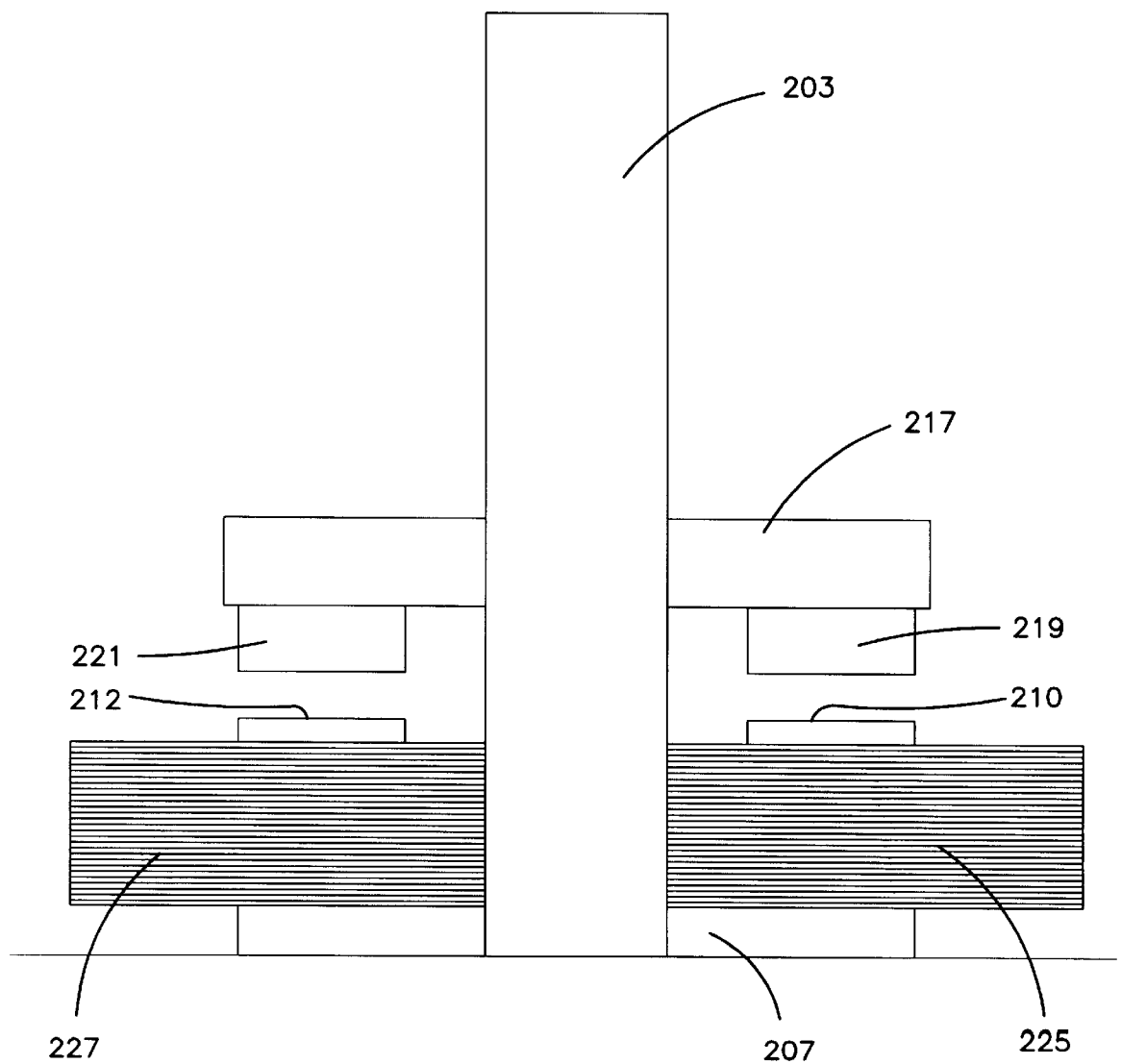
FIG. 4 shows a side plan view of one embodiment of the present invention.

Two ferro-magnetic blocks 219 and 221 are coupled to a surface of the rotational mass facing the bottom frame member 207. The ferro-magnetic blocks 219 and 221 may be configured to be equidistant from the pin 215 so that each ferro-magnetic block is suspended above one of the side posts 209 and 211 of the bottom frame member 207. As shown in FIGS. 3 and 4, the ferro-magnetic blocks 219 and 221 and the uppermost ends 210 and 212 of the side posts over which they are suspended define an air gap. The ferro-magnetic blocks 219 and 221 may be configured to have a cross section, defined by a plane parallel to the disc drive housing 106, substantially identical in size and shape of a similarly defined cross section of the uppermost ends 210 and 212 of the side posts 209 and 211.

A portion of the cross section of each ferro-magnetic block overlaps the cross section of the uppermost ends of the side posts. The ferro-magnetic blocks 219 and 221 are configured so that when the accelerometer is at rest only a portion of the cross section of each block is suspended above the uppermost ends of the side posts. As shown in FIGS. 2 and 3 ferro-magnetic blocks 219 and 221 are offset so that not all of the cross section of the blocks is suspended above the side posts 209 and 211. By configuring the ferro-magnetic blocks in this manner, the direction of the acceleration can be identified by the change in inductance of the system being either positive or negative. As is discussed below, depending on the direction of the angular acceleration, the portion of the ferro-magnetic blocks that overlaps the side posts will either increase or decrease. The ferro-magnetic blocks 219 and 221 may be soft iron, stainless steal, magnets or any other ferromagnetic material.

Around at least one of the side posts is wound a first wire coil 225. Preferably, a second wire coil 227 identical to the first wire coil 225 is wound around the second side post 211 as shown in FIG. 5. Each wire coil 225 and 227 is characterized by an inductance. The wire coils 225 and 227 are coupled to an inductance meter 231 or any other inductance sensing circuit.

The bottom cross bar 213, the side posts 209 and 211, the ferro-magnetic blocks 219 and 221, and the rotational mass 217 together define a path for magnetic flux. The magnetic flux is dependent in part on the size of the portion of the cross section of each ferro-magnetic block 219 and 221 that overlaps the cross section of the uppermost end 210 and 212 of the side posts 209 and 211. When the overlapping cross section decreases in size due to rotation of the rotational mass 217 in a first direction relative to the bottom frame member 207, the magnetic flux passing through the path decreases. Alternatively, when the overlapping cross section increases in size due to rotation of the rotational mass 217 in an direction opposite to the first direction relative to the bottom frame member 207, the magnetic flux passing through the path increases. Changing the magnetic flux passing through a wire coil will produce a proportional change in the inductance of the wire coil. The wire coils 225 and 227 are configured so that a change in the magnetic flux of the system will produce a change in the inductance of the wire coils.

The inductive rotational accelerometer 200 measures the magnitude of a rotational vibration by measuring the change in the inductance of the wire coils 225 and 227 caused by changing the magnetic flux passing through the side posts around which they are coiled. The change in magnetic flux through the side posts 209 and 211 is caused by rotation of the rotational mass 217 and ferro-magnetic blocks 219 and 221 relative to the side posts 209 and 211. The inductance meter used to detect and measure the change in inductance of the wire coils may be electrically coupled to a voltage circuit which would produce a voltage signal proportional to the change in inductance of the wire coils. The change in the inductance of the wire coils is proportional to the magnitude of rotational acceleration applied to the accelerometer.

The voltage signal produced by the present invention may be used by a servo control device of the drive controller 116 to sense and dynamically cancel rotational disturbances to a disc drive. Rotational accelerations as small as 21 rad/second$^2$ may cause the transducer of the transducer assembly 126 to lose its track placement. Therefore in a preferred embodiment the rotational accelerometer is configured to detect rotational accelerations as low as 21 rad/second$^2$.

The sensitivity of the accelerometer can be modified by varying the dimensions of the rotational mass 217 and the pin 215. The dimensions of the pin 215 such as length and diameter define a spring constant value for the pin. The change in inductance of the system produced by any angular acceleration is inversely proportional to the spring constant of the pin 215. For example, lengthening the pin 215 or decreasing its diameter will decrease the spring constant value for the pin 215 resulting in an increase in the change of inductance produced by angular acceleration. Similarly, the dimensions of the rotational mass 217 may be varied in order to provide a voltage signal response for rotational accelerations within a measurement bandwidth of interest. For example, increasing the rotational inertia of the rotational mass 217 will increase the displacement of the mass when the system is subject to rotational acceleration thereby increasing the sensitivity of the accelerometer. In addition, the design of the accelerometer is such that the symmetry of the accelerometer cancels out the effects of translational accelerations thereby minimizing the effect of translational acceleration on the accelerometer.

The dimensions of the rotational mass 217 are preferably configured so that the system is characterized by a natural frequency which is several times the value of a maximum frequency of angular accelerations to be measured by the accelerometer. The natural frequency of the system is proportional to the square root of the quantity, the spring constant of the pin 215 divided by the moment of inertia of the rotational mass 217. This relationship is expressed in the formula: $\omega \sqrt{(K/J)}$, where $\omega$ is the natural frequency of the system, K is the spring constant of the pin 215, and J is the inertia of the rotational mass 217. For a maximum frequency of angular accelerations of 800 Hz, the system is preferably configured with a natural frequency between 3000 and 5000 Hz.

In summary, the present invention is directed to an apparatus for detecting and measuring rotational vibration of a disc drive 100 having a top frame member 203, a bottom frame member 207, a pin 215, a rotational mass 217 attached to the pin 215, a first and second ferro-magnetic blocks 219 and 221 and a wire coil 225. The top frame member 203 has a cross bar and is coupled to the disc drive. The bottom frame member 207 has two side posts 209 and 211 and a bottom cross bar 213. The bottom cross bar 213 is coupled to the disc drive 100 and couples the two lower side posts 209 and 211. The pin 215 has a top end 214 and a bottom end 216 and the top end 214 is coupled to the cross bar 205 of the top frame member 203 and the bottom end 216 is coupled to the cross bar 213 of the bottom frame member 207. The rotational mass 217 is disposed on the pin 215 so as to surround the pin 215. The rotational mass 217 has a moment of inertia. The first and second ferro-magnetic blocks 219 and 221 are disposed on a surface of the rotational mass 217 facing the bottom frame member 207. Each of the ferro-magnetic blocks 219 and 221 is suspended above one of the uppermost ends of the two side posts 209 and 211 of the bottom frame member 207 to define an air gap therebetween. The ferro-magnetic blocks 219 and 221 have a surface area that overlaps the side posts 209 and 211. The wire coil 225 is disposed around one of the side posts of the bottom frame member 207 and is electrically coupled to an inductance meter 231. When an angular accelerating force is applied to the disc drive 100, the top and bottom frame members 203 and 207 rotate relative to the rotational mass 217 due to the inertia of the rotational mass 217 thereby causing the cross sections of the conducting blocks 219 and 221 that overlap the side-posts 209 and 211 to change in area resulting in a change in the inductance of the wire coil 225.

In addition there is provided an apparatus for detecting and measuring rotational vibration and acceleration of a disc drive 100 to assist in servo control. The apparatus includes a ferro-magnetic rotational mass 217 connected to a frame member that is mounted on the disc drive 100 by a mounting means 215. The mounting means is capable of torsional movement where the rotational mass 217 is characterized by a moment of inertia. A ferro-magnetic block 219 is disposed on the rotational mass 217 and acts with the rotational mass 217 and the frame member to define a path for magnetic flux. The path for magnetic flux is characterized at at least one point by a cross sectional area defined by an area that the ferro-magnetic block 219 overlaps the frame member. Also included is a wire coil 225 around the frame member that is electrically connected to a means for measuring 231 the inductance of the coil. When the disc drive 100 experiences angular acceleration, the frame member connected to the disc drive 100 moves rotationally relative to the rotational mass 217 to cause a change in the cross-sectional area of the path for magnetic flux thereby producing a change in the inductance of the wire coil 225 as measured by the measuring means 231. The change in inductance of the wire coil 225 is proportional to the angular acceleration of the disc drive 100. The apparatus detects and measures the angular acceleration of the disc drive 100.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for detecting and measuring rotational vibration of a disc drive comprising:

a top frame member having a cross bar, the top frame member being coupled to the disc drive;

a bottom frame member having two lower side-posts and a bottom cross bar, the bottom cross bar being coupled to the disc drive and coupling the two lower side-posts, wherein each side post has an uppermost end;

a pin having a top end and a bottom end, the top end being coupled to the cross bar of the top frame member and the bottom end being coupled to the cross bar of the bottom frame member;

a rotational mass disposed on the pin so as to surround the pin, wherein the rotational mass has a moment of inertia;

first and second ferro-magnetic blocks disposed on a surface of the rotational mass facing the bottom frame member, each of the ferro-magnetic blocks being suspended above one of the uppermost ends of the two side-posts of the bottom frame member to define an air gap therebetween, the ferro-magnetic blocks having a surface area that overlaps the side-posts, the surface area that overlaps the side-posts changing in size when the rotational mass experiences angular acceleration relative to the bottom frame member, the ferromagnetic blocks with the rotational mass and the bottom frame member providing a path for magnetic flux; and a wire coil disposed around one of the side-posts of the bottom frame member, the coil being electrically coupled to an inductance meter for measuring a change in the inductance of the wire coil caused by a change in the magnetic flux through the path when the surface area of the conductive blocks that overlaps the side-posts changes in size.

2. The apparatus of claim 1 wherein the ferro-magnetic blocks are shaped such that a cross section of the ferro-magnetic blocks in a plane perpendicular to the length of the pin matches a similarly defined cross section of the lower side-posts of the bottom frame member.

3. The apparatus of claim 1 wherein the ferro-magnetic blocks are disposed on the rotational mass so that the blocks are separated from each other by a distance equal to a distance separating the two lower side-posts of the bottom frame member.

4. The apparatus of claim 1 wherein the inductance meter is a tuned oscillator comprising an inductance sensing circuit for producing a voltage output proportional to rotational acceleration of the hard disc drive.

5. The apparatus of claim 1 further comprising a second wire coil disposed around the second side post of the bottom frame member, the coil being electrically coupled to an inductance meter.

6. The apparatus of claim 1 wherein the rotational mass is shaped as a disc.

7. The apparatus of claim 1 wherein the ferro-magnetic blocks are soft iron.

8. The apparatus of claim 1 wherein the rotational mass is centered on the pin.

9. The apparatus of claim 1 wherein the top frame member, bottom frame member, and rotational mass are steel and the pin is mechanically pressed through the rotational mass.

10. An apparatus for detecting and measuring rotational vibration and acceleration of a disc drive to assist in servo control comprising:

(a) a ferro-magnetic rotational mass connected to a frame member by a mounting means, the mounting means being capable of torsional movement, the rotational mass characterized by a moment of inertia, the frame member being mounted to the disc drive, (b) a ferro-magnetic block disposed on the rotational mass, the ferro-magnetic block acting with the rotational mass and the frame member to define a path for magnetic flux, the path for magnetic flux characterized at at least one point by a cross sectional area defined by an area that the ferro-magnetic block overlaps the frame member, the cross sectional area changing in size when the apparatus experiences rotational acceleration, (c) a wire coil around the frame member, the wire coil being electrically connected to a means for measuring a change in inductance of the coil caused by rotational acceleration.

11. The apparatus of claim 10 wherein the mounting means is a pin.

12. The apparatus of claim 10 further comprising a second wire coil around the frame member, the second wire coil being electrically connected to a means for measuring the inductance of the second wire coil.

13. The apparatus of claim 10 wherein the rotational mass is shaped as a disc.

14. The apparatus of claim 10 wherein the ferro-magnetic block is soft iron.

15. An apparatus for detecting and measuring rotational vibration and acceleration of a disc drive to assist in servo control comprising:

a ferro-magnetic rotational mass connected to a frame member by a mounting means, the mounting means being capable of torsional movement, the rotational mass characterized by a moment of inertia, the frame member being mounted to the disc drive and a ferro-magnetic block disposed on the rotational mass, the ferro-magnetic block acting with the rotational mass and the frame member to define a path for magnetic flux wherein the path for magnetic flux is characterized at at least one point by a cross sectional area defined by an area that the ferro-magnetic block overlaps the frame member; and means mounted on the frame member for measuring inductance.

16. The apparatus of claim 15 wherein the mounting means is a pin.

17. The apparatus of claim 15 wherein the means for measuring inductance is a wire coil wrapped around the frame member.

18. The apparatus of claim 15 further comprising a second wire coil wrapped around the frame member, the second wire coil being electrically connected to a means for measuring inductance of the second wire coil.

19. The apparatus of claim 15 wherein the rotational mass is shaped as a disc.

20. The apparatus of claim 15 wherein the ferro-magnetic block is soft iron.

* * * * *